United States Patent
Wirtanen (10) Patent No.: US 8,766,926 B2
(45) Date of Patent: Jul. 1, 2014

(54) TOUCH-SENSITIVE DISPLAY AND METHOD OF CONTROLLING SAME

(75) Inventor: Jeffrey William Wirtanen, Kanata (CA)

(73) Assignee: BlackBerry Limited, Waterloo (CA)

( * ) Notice: Subject to any disclaimer, the term of this patent is extended or adjusted under 35 U.S.C. 154(b) by 1246 days.

(21) Appl. No.: 12/578,903

(22) Filed: Oct. 14, 2009

(65) Prior Publication Data

US 2011/0084913 A1    Apr. 14, 2011

(51) Int. Cl.
*G06F 3/041* (2006.01)
*G06F 3/0487* (2013.01)
*G06F 3/0346* (2013.01)
*G06F 3/0488* (2013.01)

(52) U.S. Cl.
CPC .......... *G06F 3/04886* (2013.01); *G06F 3/0487* (2013.01); *G06F 3/0346* (2013.01)
USPC ..... 345/173; 178/18.01; 345/169; 361/679.3; 455/566; 715/700

(58) Field of Classification Search
CPC .............................................. G06F 2200/1614
USPC ............. 345/173, 169; 178/18.01; 361/679.3; 455/566; 715/700
See application file for complete search history.

(56) References Cited

U.S. PATENT DOCUMENTS

| | | | |
|---|---|---|---|
| 6,882,335 B2 | 4/2005 | Saarinen | |
| 6,888,532 B2 | 5/2005 | Wong et al. | |
| 7,256,767 B2 | 8/2007 | Wong et al. | |
| 8,125,461 B2 * | 2/2012 | Weber et al. | 345/173 |
| 2005/0246365 A1 | 11/2005 | Lowles | |
| 2005/0277448 A1 | 12/2005 | Castaneda et al. | |
| 2006/0022953 A1* | 2/2006 | Franttila | 345/173 |
| 2008/0074442 A1 | 3/2008 | Taniguchi et al. | |
| 2008/0165152 A1 | 7/2008 | Forstall et al. | |

(Continued)

FOREIGN PATENT DOCUMENTS

| EP | 1775925 A3 | 4/2007 |
|---|---|---|
| EP | 1124175 B1 | 8/2007 |

(Continued)

OTHER PUBLICATIONS

"Actively Mobile, Mobile Design for Running", Jennifer L. Bove, j.bove@interaction-ivrea.it, Interaction Design Institute Ivrea, May 2005, pp. 1-177.

(Continued)

*Primary Examiner* — Abbas Abdulselam
*Assistant Examiner* — Shawna Stepp Jones
(74) *Attorney, Agent, or Firm* — Geoffrey deKleine; Borden Ladner Gervais LLP (57) ABSTRACT

A method includes displaying a set of buttons in a first layout on a touch-sensitive display when a first orientation of the portable electronic device is detected and in a second layout on the touch-sensitive display when a second orientation of the portable electronic device is detected. An alternate mode of operation of a portable electronic device is detected. While in the alternate mode, the set of buttons is displayed in a third layout, wherein the set of buttons is displayed in a set of respective locations with respect to the touch-sensitive display for the first orientation and the second orientation. At least some information is displayed based on a detected orientation of the portable electronic device.

20 Claims, 4 Drawing Sheets

(56) References Cited

U.S. PATENT DOCUMENTS

| | | | |
|---|---|---|---|
| 2009/0179854 A1 | 7/2009 | Weber et al. | |
| 2010/0053089 A1* | 3/2010 | Kwok et al. | 345/173 |
| 2010/0103127 A1 | 4/2010 | Park et al. | |
| 2010/0222046 A1* | 9/2010 | Cumming | 455/418 |
| 2011/0018695 A1* | 1/2011 | Bells et al. | 340/407.2 |

FOREIGN PATENT DOCUMENTS

| | | |
|---|---|---|
| KR | 10-2008-0027111 | 3/2008 |
| KR | 10-2008-0078618 | 8/2008 |
| KR | 10-2008-0083974 | 8/2008 |
| WO | 2005069593 A1 | 7/2005 |
| WO | 2008030976 | 3/2008 |
| WO | 2008085741 A2 | 7/2008 |

OTHER PUBLICATIONS

Office Action dated Dec. 20, 2011, issued from corresponding KR application No. 10-2010-0093248.
Final Office Action dated Apr. 27, 2012, issued from corresponding KR application No. 10-2010-0093248 and English translation.
Anonymous, "i Phone OS version history", Jun. 29, 2007, http://en.wikipedia.org/wiki/IPhone_OS_version_history, retrieved on ec. 22, 2009, pp. 1-8.
Extended European Search Report, European Patent Application No. 09173043.2, dated Jan. 15, 2010, 8 pages.
Canadian office action for corresponding Canadian Patent Application No. 2,713,796, dated Feb. 19, 2013, 4 pages.

* cited by examiner

TOUCH-SENSITIVE DISPLAY AND METHOD OF CONTROLLING SAME

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in touch-sensitive devices are therefore desirable.

DETAILED DESCRIPTION

The following describes an apparatus for and method of controlling a portable electronic device. In a default or normal mode, information and buttons may be displayed in different layouts based on an orientation of the portable electronic device. For example, a generally rectangular device typically has a portrait orientation, where the longer dimension is disposed vertically, and a landscape orientation, where the longer dimension is disposed horizontally, relative to a user's view. A device may have two landscape orientations and two portrait orientations. Other orientations may be possible. In an alternate or second mode, a set of the buttons is displayed is the same respective locations, in at least two orientations. At least some of the information is displayed based on the detected orientation of the device. When in the alternate mode, changing of the portable electronic device between orientations does not alter the location of the set of buttons, thus facilitating easier selection of any of the set of buttons.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

Figure 1:
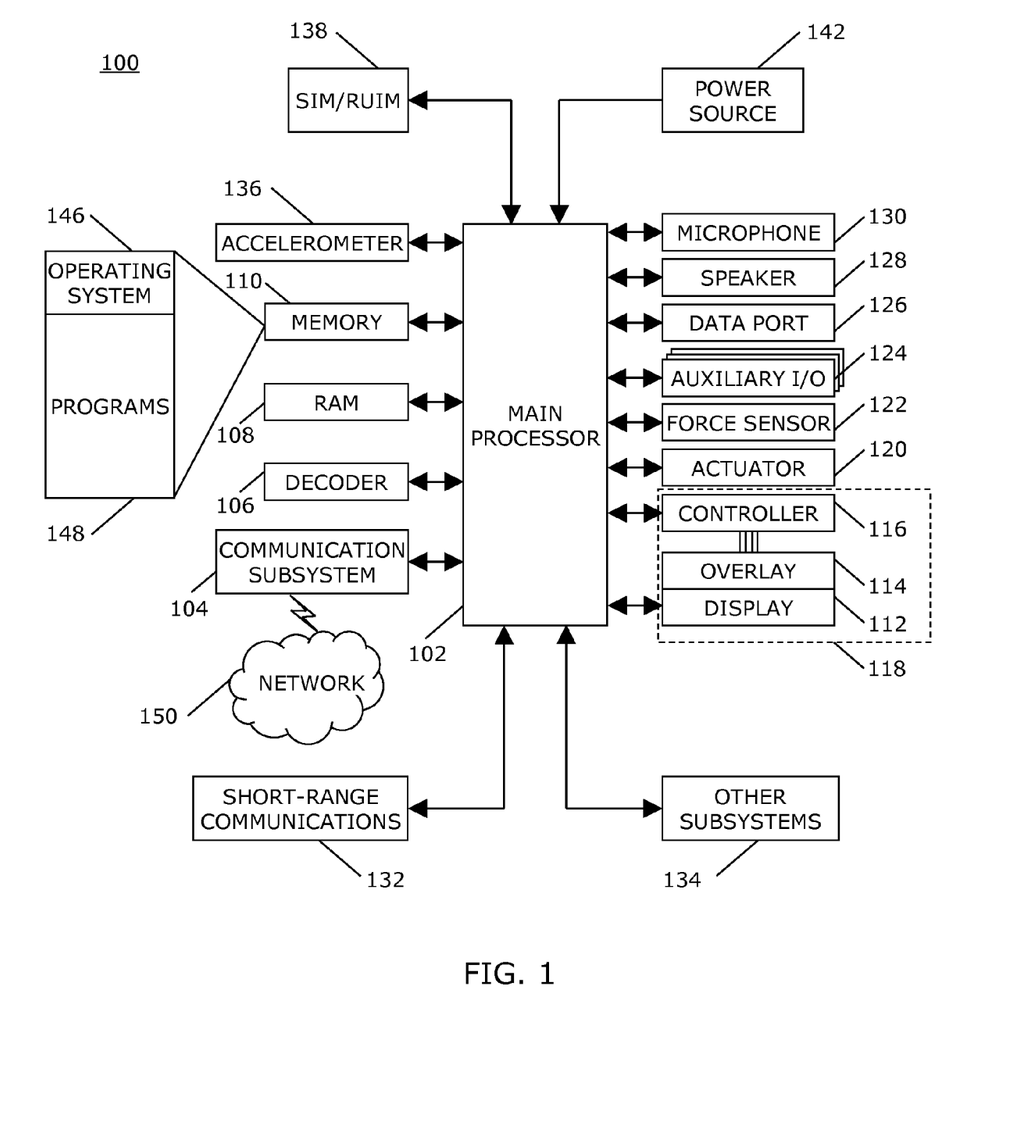
FIG. 1 is a block diagram of a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces. The accelerometer 136 may include a cantilever beam with a proof mass and suitable deflection sensing circuitry.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the processor 102, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x location component may be determined by a signal generated from one touch sensor layer, and the y location component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback. When a mechanical dome switch actuator is utilized, tactile feedback is provided when the dome collapses due to imparted force and when the dome returns to the rest position after release of the switch.

The actuator 120 may comprise one or more piezoelectric (piezo) actuators that provide tactile feedback. Contraction of the piezo actuator(s) applies a spring-like force against the touch-sensitive display 118, opposing any force externally applied to the display 118. Each piezo actuator includes a piezoelectric device, such as a piezoelectric ceramic disk adhered to a metal substrate. The metal substrate bends when the piezo disk contracts due to build up of charge at the piezo disk or in response to an external force applied to the touch-sensitive display 118. The charge may be adjusted by varying the applied voltage or current, thereby controlling the force applied by the piezo disks on the touch-sensitive display 118. The charge on the piezo actuator may be removed by a controlled discharge current that causes the piezo disk to expand, releasing the force thereby decreasing the force applied by the piezo disks on the touch-sensitive display 118. The charge may advantageously be removed over a relatively short period of time to provide tactile feedback to the user. Absent an external force applied to the overlay 114 and absent a charge on the piezo disk, the piezo disk may be slightly bent due to a mechanical preload.

Figure 2:
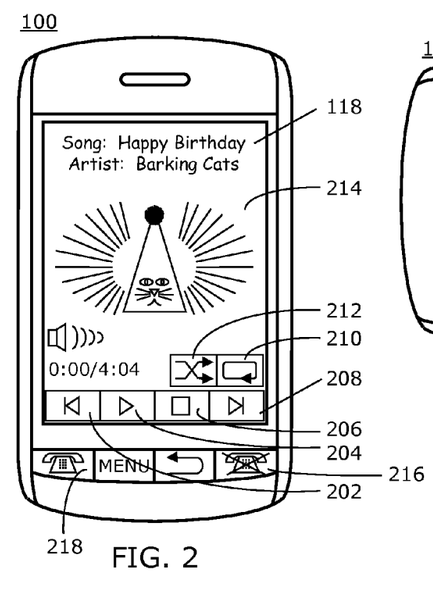
FIG. 2 illustrates information and buttons displayed on a touch-sensitive display of a portable electronic device in a portrait orientation in accordance with the disclosure.
Figure 3:
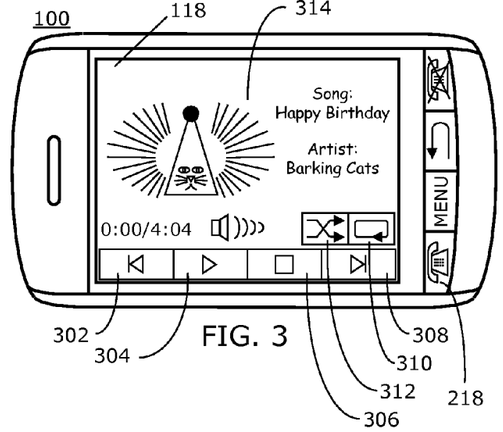
FIG. 3 illustrates information and buttons displayed on a touch-sensitive display of a portable electronic device in a landscape orientation in accordance with the disclosure.

Information and buttons are displayed on a touch-sensitive display 118 of a portable electronic device 100 in a portrait orientation in the example of FIG. 2. When the orientation of the portable electronic device 100 is landscape, the application displays effectively the same information in a layout more suitable to landscape orientation as shown in FIG. 3. Numerous virtual or soft buttons, also known as keys, are displayed on the touch-sensitive display 118, which, for the sake of simplicity, will simply be referred to as buttons throughout the description and claims. The buttons often vary between applications. A music player is illustrated in the example. The buttons, when selected, provide user input such as data entry, control, or functions that facilitate use of the portable electronic device. Depending on the application, the number of buttons displayed varies at any given time between one button and any suitable number of simultaneously-displayed buttons. Other buttons 216, 218 may have fixed locations relative to the touch-sensitive display 118. These buttons 216, 218 may be virtual buttons or physical buttons.

The content in the buttons 202, 204, 206, 208, 210, 212 and information 214 in the portrait orientation of FIG. 2 is similar to the content in the buttons 302, 304, 306, 308, 310, 312 and information 314 in the landscape orientation of FIG. 3, although the buttons 302, 304, 306, 308, 310, 312 and information 314 are distributed differently across the touch-sensitive display 118 and are displayed in different sizes to accommodate the different orientation. Each of the buttons 202, 204, 206, 208, 210, 212 in the portrait layout is shown in a different location than the buttons 302, 304, 306, 308, 310, 312 in the landscape layout relative to the touch-sensitive display 118. For example, the play button 204 is displayed along the width of the display 118 near the "MENU" button in portrait orientation, whereas the play button 304 is not displayed near the "MENU" button in landscape orientation, but rather along the length of the display 118. The forward button 208 is shown displayed near the End/Power button 216 in portrait orientation, whereas the forward button 308 is displayed near the send button 218 in landscape orientation.

The portable electronic device 100 detects its orientation, e.g., portrait or landscape. Such detection may include use of an accelerometer 136, user entry of the orientation, and other methods and/or apparatus known in the art. When using an accelerometer 136 or other automatic techniques/mechanisms, significant movement of the portable electronic device 100 may cause the device 110 to change orientation at an inopportune time, for example, when the user is attempting to select a button to perform a function or enter data. For example, if the user is in the process of selecting the portrait reverse button 202 while the orientation of the device 100 changes to landscape, the user may unintentionally select the forward button 308 instead.

Figure 4:
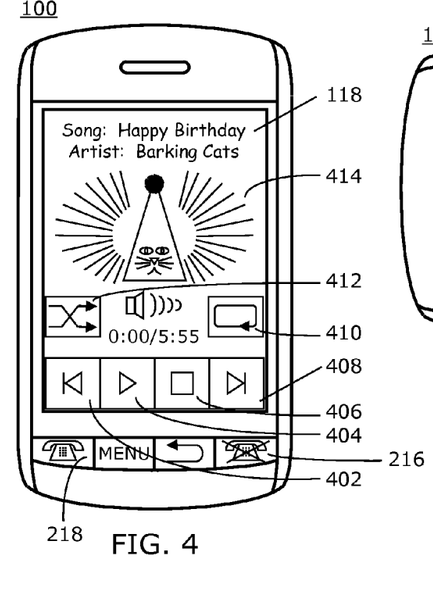
FIG. 4 and FIG. 5 illustrate information and buttons displayed on a touch-sensitive display of a portable electronic device during an alternate mode in accordance with the disclosure.
Figure 5:
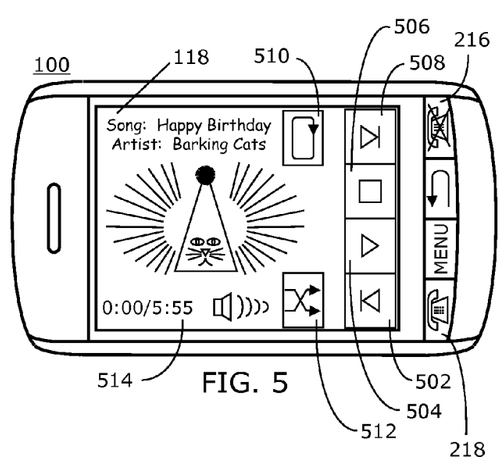

Information and buttons displayed on a touch-sensitive display 118 of a portable electronic device 100 during an alternate mode are shown in FIG. 4 and FIG. 5. In the alternate mode, some to all of the buttons for an application are displayed in the same respective locations with respect to the touch-sensitive display 118 for different orientations of the device 100. In the example of FIG. 4 and FIG. 5, all of the buttons are displayed in the same respective locations relative to the display 118. For example, the reverse button 402 is located in the corner of the touch-sensitive display 118 near the off-hook button 218 in portrait orientation. The reverse button 502 is in the same corner of the touch-sensitive display 118 near the off-hook button 218 in landscape orientation. In another example, the forward button 408 is located in the corner of the touch-sensitive display 118 near the hang-up button 216 in portrait orientation. The forward button 502 is located in the same corner of the touch-sensitive display 118 near the hang-up button 216 in landscape orientation. By locating the buttons 402/502, 404/504, 406/506, 408/508, 410/510, 412/512 in the same respective locations relative to the touch-sensitive display 118 in multiple orientations, a higher likelihood of successfully selecting the intended button results because an orientation change does not result in a change in location for the buttons.

All of the buttons 402/502, 404/504, 406/506, 408/508, 410/510, 412/512 are shown displayed having the same respective size for portrait and landscape orientations in the example of FIG. 4 and FIG. 5. For example, the displayed size of the reverse button 402/502 is the same size in the portrait and landscape orientations. By sizing the buttons 402/502, 404/504, 406/506, 408/508, 410/510, 412/512 the same in multiple orientations, the area of selection remains in same, resulting in a higher likelihood of successfully selecting the intended button during an orientation change. Although many of the buttons 402/502, 404/504, 406/506, 408/508, are shown having the same displayed size, some buttons 410/510, 412/512 may have different relative sizes. For example, the loop button 410/510 and the shuffle button 412/512 are displayed in a smaller size than the other buttons 402/502, 404/504, 406/506, 408/508, although their respective sizes between the orientations is the same. Thus, the loop button 410 in portrait orientation is displayed in the same size as the loop button 510 in landscape orientation in this example.

The buttons 402/502, 404/504, 406/506, 408/508, 410/510, 412/512 in the alternate mode of FIG. 4 and FIG. 5 are shown displayed in a size larger than the size of the respective buttons 202/302, 204/304, 206/306, 208/308, 210/310, 212/312 in the default or normal mode of FIG. 2 and FIG. 3, respectively. When the buttons 402/502, 404/504, 406/506, 408/508, 410/510, 412/512 are displayed in a larger size in the alternate mode than in a normal or default mode, the selection area increases, resulting in a higher likelihood of successfully selecting the intended button even when an orientation change occurs. Optionally, at least some of the more critical information may be displayed in a larger size in the alternative mode, e.g., with a larger font or symbol size. Information displayed on the buttons may advantageously be enlarged, such as shown in FIG. 4 and FIG. 5, when compared to the default or normal mode of FIG. 2 and FIG. 3, respectively. Other information may also be displayed in a larger size in the alternate mode than the default or normal mode.

Although the set of buttons has the same layout relative to the touch-sensitive display 118 as shown in FIG. 4 and FIG. 5, the information 414/514 is shown displayed relative to the orientation. By orienting the information 414/514 relative to the orientation of the device 100, as shown in FIG. 4 and FIG. 5, the user is better able to read and interpret the information. For example, the text and symbols are shown in the same orientation with respect to the viewer, not the touch-sensitive display 118, in FIG. 4 and FIG. 5. The reverse button 402/502 and forward button 408/508 may be difficult to interpret, given their similarity, if they were fixed relative to the display 118, because the symbols would point up and down, not left and right by convention. Thus, displaying at least some of the information relative to the user, i.e., by orientation of the device 100, results in less confusion and easier reading. The alternate mode thus provides many advantages over simply freezing the display of the portable electronic device in either portrait or landscape orientation regardless of the orientation of the device.

Figure 6:
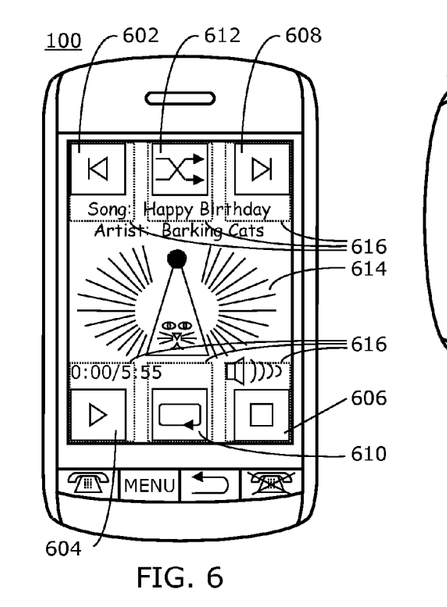
FIG. 6 and FIG. 7 illustrate information and distributed buttons displayed on a touch-sensitive display of a portable electronic device during an alternate mode in accordance with the disclosure.
Figure 7:
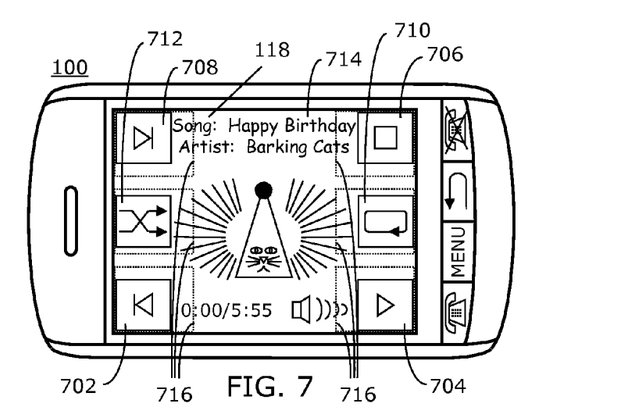

Information 614/714 and distributed buttons displayed on a touch-sensitive display 118 of a portable electronic device 118 during the alternate mode are shown in FIG. 6 and FIG. 7. The buttons 602/702, 604/704, 606/706, 608/708, 610/710, 612/712 in this example are distributed across the touch-sensitive display 118 to increase the likelihood of successful selection of the buttons. As shown in FIG. 6 and FIG. 7, the buttons in the alternate mode are located further apart than the buttons in the normal mode, for example, as shown in FIG. 2 and FIG. 3. The buttons 602/702, 604/704, 606/706, 608/708 that are selected more often are disposed in the corners of the touch-sensitive display 118, resulting in easier visual and tactile location of these buttons. The remaining buttons 610/710, 612/712 are shown located between the other buttons 602/702, 604/704, 606/706, 608/708.

Typically, an active area for a displayed button is the same as the displayed area for the button. When an appropriate touch is detected in an active area associated with a button, the button is selected. As shown in FIG. 6 and FIG. 7, the active areas 616/716 are shown larger than the displayed area for each of the buttons 602/702, 604/704, 606/706, 608/708, 610/710, 612/712. The active areas 616/716 need not be larger than the displayed area for each of the buttons. By utilizing larger active areas 616/716 than displayed areas for the buttons, a higher likelihood of successfully selecting the intended button results because the selection area is larger and an orientation change is less likely to affect selection.

Figure 8:
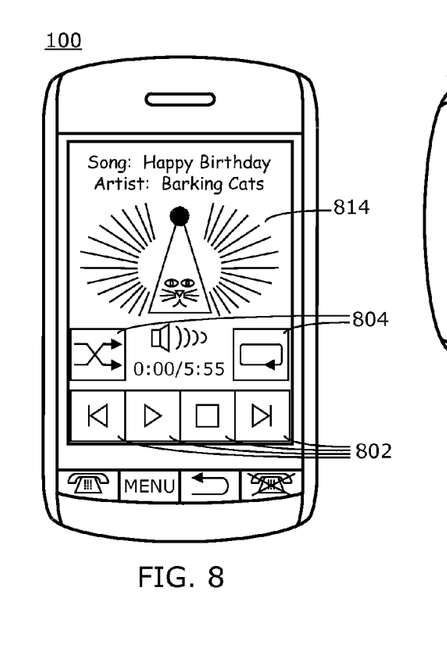
FIG. 8 and FIG. 9 illustrate information and buttons displayed on a touch-sensitive display of a portable electronic device during an alternate mode in accordance with the disclosure.
Figure 9:
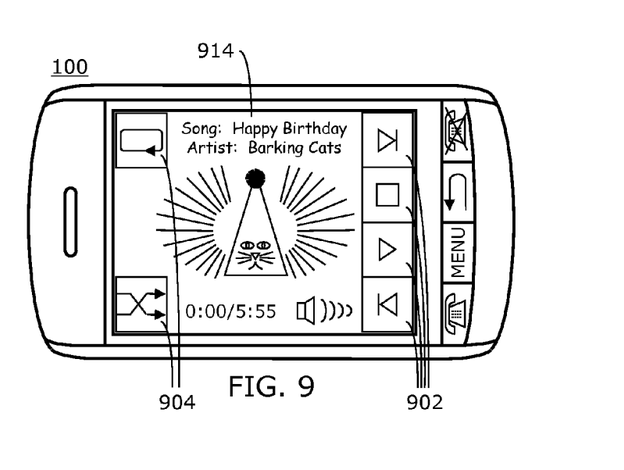

Information 814/914 and buttons 802/902 displayed on a touch-sensitive display 118 of a portable electronic device 100 during an alternate mode are shown in FIG. 8 and FIG. 9. In the above examples, all of the buttons are maintained in the same respective locations for different orientations. In the examples shown in FIG. 8 and FIG. 9, the set of buttons that are maintained in the same respective locations for different orientations is a subset of the all of the buttons for the application. In this example, the subset of buttons is the set of critical buttons 802/902 for the music application, and the critical buttons 802/902 are displayed in the same respective locations for multiple orientations. The non-critical buttons 804/904 may not be displayed in the same respective locations for multiple orientations. The non-critical buttons 804/

904 may not be displayed with the same respective areas and/or with a larger display area than in normal or default mode. Such display of buttons provides more flexibility when displaying the information 814/914, while increasing the likelihood of selection during orientation changes. Critical buttons may be the more important buttons to the function of the application or may be the buttons selected more often. The critical buttons 802/902 are advantageously maintained in the same respective locations and/or in the same respective size for different orientations and may also be displayed in a larger size for the alternate mode than for the normal or default mode. Larger active areas (not shown) may also be utilized for critical buttons. A subset of all the buttons may be utilized to make selection of critical buttons easier or because limited space is present for larger buttons in the alternate mode.

The information 414/514, 614/714, 814/914 may be displayed in a reduced size in the alternate mode when compared to the normal mode. Although the examples provided in the disclosure relate to a music player, the present disclosure may be applied to other applications, such as video players, email applications, cell phone dialing applications, contacts, and many more applications.

Figure 10:
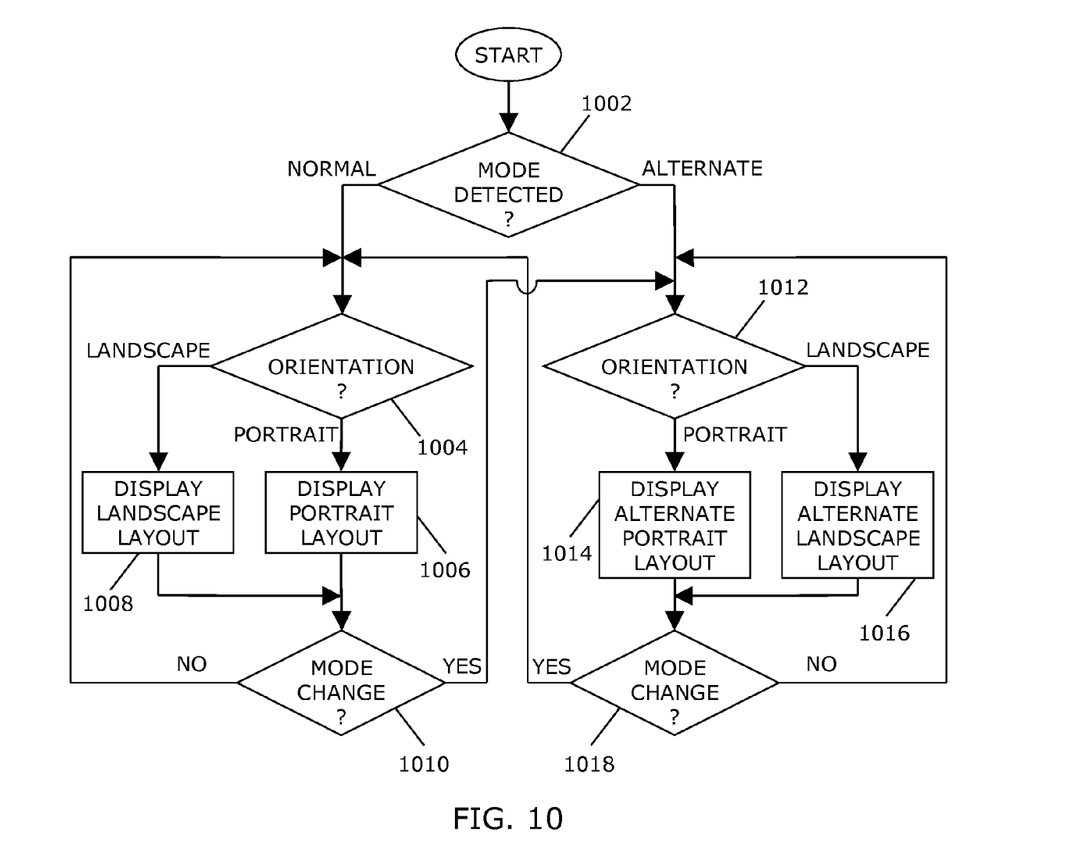
FIG. 10 is a flowchart illustrating a method of displaying information and buttons taking into account orientation and mode of a portable electronic device in accordance with the disclosure.

A flowchart illustrating a method of displaying information and buttons taking into account orientation and mode of a portable electronic device is shown in FIG. 10. The method may be carried out by software executed by, for example, the processor 102. Coding of software for carrying out such a method is within the scope of a person of ordinary skill in the art given the present description. The method may contain additional and/or fewer processes than shown or described.

A mode of the portable electronic device 100 is detected 1002 and subsequently entered. Detection may take place in a number of ways. For example, the user may select the mode, normal or alternate, through a menu. The user may select the alternate mode when the user is about to engage in an activity, such as jogging or bicycling, that frequently jostles the device 100. The alternate mode may be detected by identifying movement of the portable electronic 100 in accordance with one or more movement criteria. The accelerometer 136 may be utilized to detect orientation changes, and one movement criterion may be a predetermined number of orientation changes during a given period of time. Movement in accordance with other movement criteria may include 'jitter' of the device, when the accelerometer detects more movement than is typically associated with low-effort walking on a smooth surface, for example, movement that may be detected by a pedometer or other such device. Such movement may occur, for example, when a user is jogging, bicycling, riding or driving on a rough road, working on an exercise machine, standing on a train, e.g., subway, or train platform, riding on a motorcycle, or engaging in other activity that frequently jostles the device 100, and so forth. The normal or default mode may be detected by absence of detection of the alternate mode, e.g., the normal mode may be the default mode when no other mode is detected.

When the normal or default mode is entered, an orientation of the portable electronic device 100 is determined 1004. Determination of the orientation of the device 100 is described above. When a portrait orientation is detected, a portrait layout, such as shown in FIG. 2, is displayed 1006. When a landscape orientation is detected, a landscape layout, such as shown in FIG. 3, is displayed 1008. Unless a mode change is detected 1010, the process continues at 1004. When a mode change is detected, the process continues at 1012. The mode change may be detected 1010 by detecting the alternate mode, as described above.

When the alternate mode is entered, an orientation of the portable electronic device 100 is determined 1012. Determination of the orientation of the device 100 is described above. When a portrait orientation is detected, an alternate portrait layout, such as shown in FIG. 4, FIG. 6, or FIG. 8, is displayed 1014. When a landscape orientation is detected, an alternate landscape layout, such as shown in FIG. 5, FIG. 7, or FIG. 9, is displayed 1016. Unless a mode change is detected 1018, the process continues at 1004. When a mode change is detected, the process continues at 1004. The mode change may be detected 1018 by user selection of the normal mode, after a period of time once a movement criterion is met, once one or more movement criteria are not met for a predetermined period of time, and so forth.

Optionally, when entering the alternate mode, a force threshold, utilized to select at least one of the set of buttons, may be reduced. A reduced force threshold facilitates a lesser force applied to select a button, which may be advantageous, for example, when the device 100 is moving. Another option includes increasing the size of at least some of the more critical information, e.g., increasing the font or symbol size. The more critical information may include, for example, the information displayed on the buttons or the intended information for the application running, such as email content or the symbols on a music player. The increase in size may be a user-selectable feature through a menu or pop-up window. In addition, mode detection 1002 or change 1010, 1018 may take place at any time, although shown in specific places in the flowchart.

A method may comprise displaying a set of buttons in a first layout on a touch-sensitive display when a first orientation of the portable electronic device is detected and in a second layout on the touch-sensitive display when a second orientation of the portable electronic device is detected. An alternate mode of operation of a portable electronic device may be detected. While in the alternate mode, the set of buttons may be displayed in a third layout, wherein the set of buttons is displayed in a set of respective locations with respect to the touch-sensitive display for the first orientation and the second orientation. At least some information may be displayed based on a detected orientation of the portable electronic device.

A portable electronic device may comprise a touch-sensitive display and a processor configured to: display, on the touch-sensitive display, a set of buttons in a first set of locations for a first orientation of the portable electronic device and in a second set of locations for a second orientation of the portable electronic device; detect an alternate mode of the portable electronic device; while in the alternate mode, display each of the set of buttons in the same respective location on the touch-sensitive display for the first orientation and the second orientation. At least some information may be displayed differently for the first orientation than for the second orientation.

The method may comprise displaying, on a touch-sensitive display, a set of buttons in a first layout when the portable electronic device is in a first orientation and in a second layout when the portable electronic device is in a second orientation. An alternate mode of operation of the portable electronic device may be detected. While in the alternate mode, the set of buttons may be displayed on the touch-sensitive display in a third layout when the portable electronic device is in the first orientation and in a fourth layout when the portable electronic device is in the second orientation. The set of buttons may be displayed in the same respective locations, relative to the touch-sensitive display, in the third layout and the fourth layout. At least some information may be displayed based on a detected orientation of the portable electronic device.

The method may comprise displaying, on a touch-sensitive display, a set of buttons in a first layout for a first orientation of the portable electronic device and in a second layout for a second orientation of the portable electronic device. The set of buttons may be displayed in a first set of locations in the first layout. The set of buttons may be displayed in a second set of locations in the second layout. The first set of locations may be substantially different from the second set of locations relative to the touch-sensitive display. In an alternate mode of the portable electronic device, a set of buttons may be displayed on the touch-sensitive display in a third layout for the first orientation of the portable electronic device and in a fourth layout for the second orientation of the portable electronic device. The set of buttons may be displayed in a third set of locations in the third layout and in a fourth set of locations in the fourth layout. The third set of locations may be substantially the same as the fourth set of locations relative to the touch-sensitive display. The third layout and the fourth layout may be different.

The alternate mode may be entered when movement of the portable electronic is detected in accordance with a movement criterion. The set of buttons may be displayed in the same respective size for the first orientation and the second orientation in the alternate mode. Each of the set of buttons may be displayed in the same respective location with respect to the touch-sensitive display for the first orientation and the second orientation in the alternate mode. A substantial number of the set of buttons may be displayed in locations relative to the touch-sensitive display, which locations are different in the first layout than in the second layout. At least one of the set of buttons may have a display area that is larger in the alternate mode than in the first layout or the second layout. At least some of the information may be displayed in a larger size in the alternate mode than in the first layout or the second layout. A force threshold utilized to select at least one of the set of buttons in the alternate mode may be reduced. The set of buttons may be a subset of buttons for an application for which the set of buttons is displayed.

At least one button of the set of buttons may be displayed in a larger size when in the alternate mode than when in the normal mode. The portable electronic device may be configured to detect its orientation. The alternate mode may be entered through selection in a menu. The first set of locations may be substantially different from the second set of locations relative to the touch-sensitive display. The set of buttons may be associated with critical functions to an application executed by the portable electronic device. A larger active area than a displayed area may be applied for at least one of the set of buttons. Locations of the set of buttons in the alternate mode may be spaced is further apart than in the normal mode.

Locating buttons in the same relative location and/or in the same size for multiple orientations results in easier and more accurate selection of buttons during orientation changes. Advantage is also gained by displaying the buttons in a larger size, with a larger active area, and/or distributed along the touch-sensitive display. Advantage may also be gained by locating or distributing the buttons further apart in the alternate mode and by utilizing a larger active area than a displayed area for the buttons. For several reasons, the alternate mode of the present disclosure is more advantageous than other methods that fix the display for all orientations in one layout, e.g., portrait or landscape. For example, information is displayed relative to the user in multiple orientations, instead of one, resulting in more readable information in each orientation, instead of only one orientation. In addition, confusion between symbols is less likely to result. Utilizing some or all of the features described herein results in more successful selection of buttons during orientation changes, e.g., between portrait and landscape orientations. More stable operation results, especially during conditions when device jostling occurs frequently, such as when a user is jogging, bicycling, riding on a rough road, and so forth. Having two modes provides the advantages of each mode during appropriate circumstances. Providing larger information size improves readability.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
    while in a first mode of operation of a portable electronic device, displaying a set of buttons in a first layout on a touch-sensitive display when a first orientation of the portable electronic device is detected and in a second layout on the touch-sensitive display when a second orientation of the portable electronic device is detected, where the first layout is different from the second layout relative to a fixed object on the portable electronic device;
    detecting an alternate mode of operation of the portable electronic device;
    while in the alternate mode, displaying the set of buttons in a third layout when the first orientation of the portable electronic device is detected and displaying the set of buttons in the third layout when the second orientation of the portable electronic device is detected such that each button of a plurality of the buttons is displayed in a same location with respect to a fixed object when the portable electronic device is in the first orientation and when the portable electronic device is in the second orientation, wherein the third layout is different from the first layout and is different from the second layout, and wherein at least some information is displayed based on a detected orientation of the portable electronic device.

2. The method of claim 1, wherein the alternate mode is entered when movement of the portable electronic is detected in accordance with a movement criterion.

3. The method of claim 1, wherein the set of buttons is displayed in the same respective size for the first orientation and the second orientation in the alternate mode.

4. The method of claim 1, wherein each of the set of buttons is displayed in the same respective location with respect to the fixed object for the first orientation and the second orientation in the alternate mode and the first orientation of the first mode.

5. The method of claim 1, wherein a substantial number of the set of buttons are displayed in locations relative to the fixed object, which locations are different in the first layout than in the second layout.

6. The method of claim 1, wherein at least one of the set of buttons has a display area that is larger in the alternate mode than in the first layout or the second layout.

7. The method of claim 1, wherein at least some of the information is displayed in a larger size in the alternate mode than in the first layout or the second layout.

8. The method of claim 1, further comprising reducing a force threshold utilized to select at least one of the set of buttons in the alternate mode.

9. The method of claim 1, wherein the set of buttons is a subset of buttons for an application for which the set of buttons is displayed.

10. A portable electronic device comprising:
a touch-sensitive display;
a processor configured to:
while in a normal mode of operation, display, on the touch-sensitive display, a set of buttons in a first layout for a first orientation of the portable electronic device and in a second layout for a second orientation of the portable electronic device, wherein the first layout is different that the second layout;
detect an alternate mode of the portable electronic device;
while in the alternate mode, display the set of buttons in a third layout for the first orientation of the portable electronic device and in the third layout for the second orientation of the portable electronic device such that each button of a plurality of the buttons is displayed in a same location with respect to a fixed object when the portable electronic device is in the first orientation and third layout is different from the first layout and is different from the second layout;
wherein at least some information is displayed differently for the first orientation than for the second orientation when in the alternate mode.

11. The portable electronic device of claim 10, wherein the alternate mode is entered when movement of the portable electronic is detected in accordance with a movement criterion.

12. The portable electronic device of claim 10, wherein at least one button of the set of buttons is displayed in a larger size when in the alternate mode than when in the normal mode.

13. The portable electronic device of claim 10, wherein the processor is further configured to reduce a force threshold utilized to select at least one of the set of buttons in the alternate mode.

14. The portable electronic device of claim 10, wherein the portable electronic device is configured to detect its orientation.

15. The portable electronic device of claim 10, wherein the alternate mode is entered through selection in a menu.

16. The portable electronic device of claim 10, wherein the buttons are displayed in a first set of locations for the first layout and in a second set of locations for the second layout, and wherein the first set of locations is substantially different from the second set of locations relative to the fixed object.

17. The portable electronic device of claim 10, wherein the set of buttons are associated with critical functions to an application executed by the portable electronic device.

18. The portable electronic device of claim 10, wherein a larger active area than a displayed area is applied for at least one of the set of buttons.

19. The portable electronic device of claim 10, wherein locations of the set of buttons in the alternate mode are spaced further apart than in the normal mode.

20. The portable electronic device of claim 10, wherein the plurality of buttons is a subset of the set of buttons for an application for which the set of buttons is displayed.

* * * * *